US012610394B2

(12) United States Patent
    Fu

(10) Patent No.: US 12,610,394 B2
(45) Date of Patent: Apr. 21, 2026

(54) METHOD, APPARATUS, USER EQUIPMENT, AND STORAGE MEDIUM FOR COMMUNICATION

(71) Applicant: Beijing Xiaomi Mobile Software Co., Ltd., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 627 days.

(21) Appl. No.: 18/030,840

(22) PCT Filed: Oct. 10, 2020

(86) PCT No.: PCT/CN2020/120234
    § 371 (c)(1),
    (2) Date: Apr. 7, 2023

(87) PCT Pub. No.: WO2022/073243
    PCT Pub. Date: Apr. 14, 2022

(65) Prior Publication Data
    US 2023/0371069 A1      Nov. 16, 2023

(51) Int. Cl.
    *H04W 74/0808* (2024.01)
(52) U.S. Cl.
    CPC ............................. *H04W 74/0808* (2013.01)
(58) Field of Classification Search
    CPC .................................................. H04W 74/0808
    See application file for complete search history.

(56) References Cited

U.S. PATENT DOCUMENTS

| 2018/0343676 A1 | 11/2018 | Yerramalli et al. |
| 2021/0007129 A1* | 1/2021 | Talarico ............ H04W 72/1268 |

FOREIGN PATENT DOCUMENTS

| CN | 106559906 A | 4/2017 |
| CN | 106576261 A | 4/2017 |
| CN | 107041000 A | 8/2017 |
| CN | 107466110 A | 12/2017 |
| CN | 107888256 A | 4/2018 |
| CN | 108781149 A | 11/2018 |
| CN | 109559795 A | 4/2019 |
| CN | 110663283 A | 1/2020 |
| CN | 110972105 A | 4/2020 |
| CN | 111342942 A | 6/2020 |
| CN | 111699641 A | 9/2020 |

(Continued)

OTHER PUBLICATIONS

Broadcom, "Discussion on short fixed duration LBT for transmissions outside a COT", 3GPP TSG RAN WG1 Meeting #96,R1-1903370,Athens, Greece, Feb. 25-Mar. 1, 2019.

(Continued)

*Primary Examiner* — Myron Wyche
(74) *Attorney, Agent, or Firm* — Volpe Koenig

(57) ABSTRACT

A method for communication, the method being applied by a user equipment and including: in response to determining that a configured grant physical uplink shared channel (CG-PUSCH) is configured and an access mechanism is No-LBT, determining whether a channel interference parameter is greater than a first threshold; and in response to determining that the channel interference parameter is greater than the first threshold, switching to an LBT mode to transmit the CG-PUSCH.

20 Claims, 3 Drawing Sheets

In response to determining that UE is configured with a configured grant physical uplink shared channel (CG-PUSCH) and a current access mechanism is no listen before talk (No-LBT), determine whether a channel interference parameter is greater than a first threshold — 201

In response to determining that the channel interference parameter is greater than the first threshold, switch to an LBT mode to transmit the CG-PUSCH — 202

(56)　　　　　　　References Cited

FOREIGN PATENT DOCUMENTS

| CN | 111713124 | A | 9/2020 |
|----|-----------|---|--------|
| EP | 3146781 | A1 | 3/2017 |
| WO | 2019221443 | A1 | 11/2019 |
| WO | 2020083265 | A1 | 4/2020 |

OTHER PUBLICATIONS

Huawei, HiSilicon, "Coexistence and channel access for NR unlicensed band operations",3GPP TSG RAN WG1 Meeting #99,R1-1911866, Reno, USA, Nov. 18-22, 2019.
Huawei, HiSilicon, "Channel access mechanism for 60 GHz unlicensed operation",3GPP TSG RAN WG1 Meeting #102-e,R1-2005242,E-meeting, Aug. 17-28, 2020.
Apple Inc., "On Channel Access Mechanisms for Unlicensed Access above 52.6 GHz", 3GPP TSG RAN WG1 #102-e,R1-2006513,e-Meeting, Aug. 17-28, 2020.

* cited by examiner

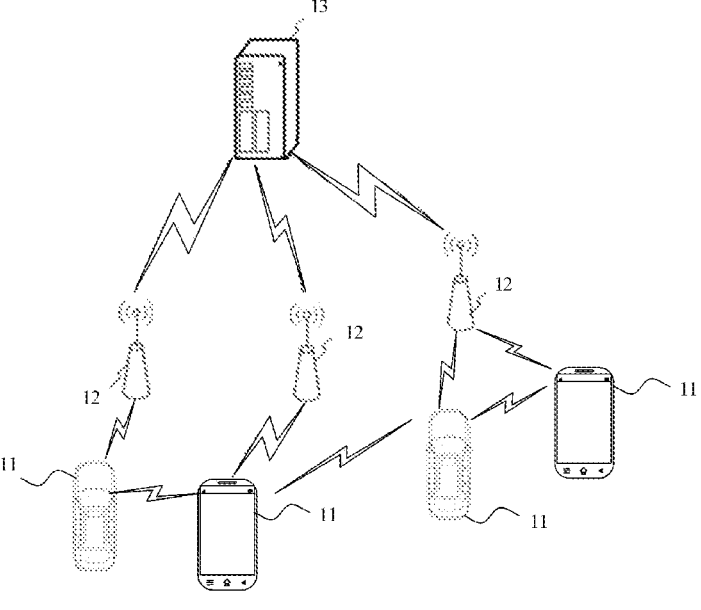

Fig. 1

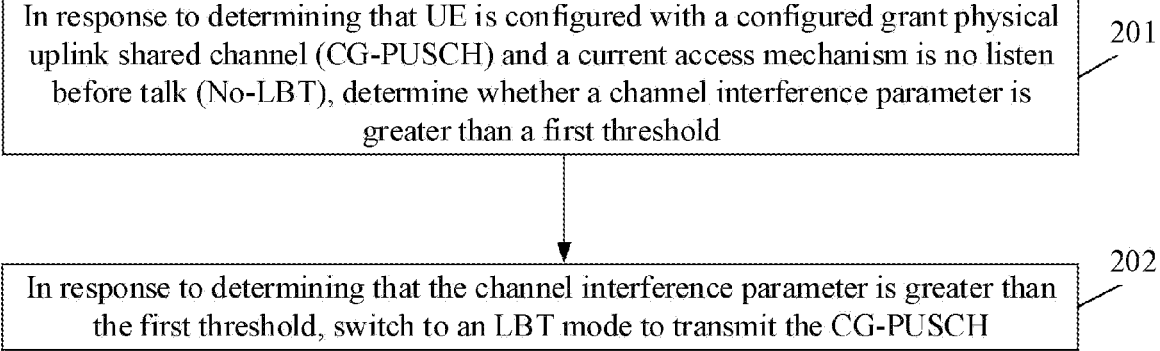

In response to determining that UE is configured with a configured grant physical uplink shared channel (CG-PUSCH) and a current access mechanism is no listen before talk (No-LBT), determine whether a channel interference parameter is greater than a first threshold — 201

In response to determining that the channel interference parameter is greater than the first threshold, switch to an LBT mode to transmit the CG-PUSCH — 202

Fig. 2

METHOD, APPARATUS, USER EQUIPMENT, AND STORAGE MEDIUM FOR COMMUNICATION

CROSS REFERENCE TO RELATED APPLICATION

The present application is a U.S. National Stage of International Application No. PCT/CN2020/120234, filed on Oct. 10, 2020, the contents of all of which are incorporated herein by reference in their entirety for all purposes.

BACKGROUND

As the shortage of radio spectrum resources grows, the use range of unlicensed spectrum expands. When the unlicensed spectrum is used, it's common practice to monitor a channel before a transmission terminal occupies the channel to transmit data, that is, a clear channel assessment (CCA). If the channel is assessed as clear, the terminal will occupy the channel to transmit the data, with a maximum channel occupy time (MCOT) specified by a protocol or configured/indicated by a base station. If the channel is assessed as busy, the terminal will not occupy the channel.

SUMMARY

The disclosure relates to an unlicensed spectrum application technology, and in particular to a method, apparatus, user equipment (UE), and a storage medium for communication.

Examples of the disclosure provide a method, apparatus, user equipment (UE), and a storage medium for communication.

In a first aspect of the examples of the disclosure, a method for communication is provided. The method is applied to a UE and including:

in response to determining that a configured grant physical uplink shared channel (CG-PUSCH) is configured and an access mechanism is No-LBT, determining whether a channel interference parameter is greater than a first threshold; and in response to determining that the channel interference parameter is greater than the first threshold, switching to an LBT mode to transmit the CG-PUSCH.

In a second aspect of the examples of the disclosure, a user equipment is provided, includes a processor, a transceiver, a memory, and an executable program stored on the memory and runnable by the processor, where when running the executable program, the processor executes steps of the method for communication in the example of the disclosure.

In a third aspect of the examples of the disclosure, a non-transitory storage medium is provided. The storage medium stores an executable program, where when executed by a processor, the executable program implements steps of the foregoing method for communication.

BRIEF DESCRIPTION OF THE DRAWINGS

The accompanying drawings are incorporated in the description as a constituent part of the description here, illustrate examples conforming to the disclosure, and serve to explain the principles of the examples of the disclosure along with the description.

FIG. 1 is a schematic structural diagram of a radio communication system shown according to an example;

FIG. 2 is a schematic flowchart of a method for communication shown according to an example;

DETAILED DESCRIPTION

Figure 3:
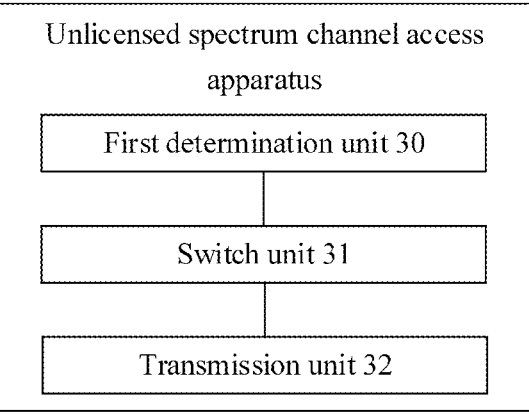
FIG. 3 is a schematic structural diagram of a composition of an apparatus for communication shown according to an example.

The examples will be described in detail here and shown in the accompanying drawings illustratively. When the following description refers to the accompanying drawings, the same numbers in different accompanying drawings represent the same or similar elements unless otherwise indicated. The embodiments described in the following examples do not denote all embodiments consistent with the examples of the disclosure. On the contrary, the embodiments are merely instances of apparatuses and methods consistent with some aspects of the examples of the disclosure as recited in the appended claims.

The terms used in the examples of the disclosure are merely to describe the particular examples, instead of limiting the examples of the disclosure. The singular forms such as "a," "the," and "this" used in the examples of the disclosure and the appended claims are also intended to include the plural forms unless otherwise clearly stated in the context. It should be understood that the term "and/or" used here refers to and encompasses any of one or more associated items listed or all possible combinations.

It should be understood that while the terms first, second, third, etc., can be employed in the examples of the disclosure to describe various information, such information should not be limited to these terms. These terms are merely used to distinguish the same type of information from each other. For example, first information can also be referred to as second information, and similarly, second information can also be referred to as first information, without departing from the scope of the examples of the disclosure. Depending on the context, the word "if" as used here can be interpreted as "at the time of," "when," or "in response to determining."

With reference to FIG. 1, a schematic structural diagram of a radio communication system according to an example of the disclosure is shown. As shown in FIG. 1, the radio communication system is a communication system based on a cellular mobile communication, and may include: several terminals 11 and several base stations 12.

The terminals 11 may be devices providing voice and/or data connectivity for a user. The terminals 11 may communicate with one or more core networks via a radio access network (RAN). The terminals 11 may be Internet of Things terminals, such as sensor devices, mobile phones (or "cellular" phones), and computers with Internet of Things terminals, for instance, stationary, portable, pocket, handheld, intra-computer, or vehicle-mounted apparatuses. For example, the terminals 11 may be a station (STA), a subscriber unit, a subscriber station, a mobile station, a mobile, a remote station, an access point, a remote terminal, an access terminal, a user terminal, a user agent, a user device, or user equipment (UE). Alternatively, the terminals 11 may also be unmanned aerial vehicles. Alternatively, the terminals 11 may also be vehicle-mounted devices, for instance, electronic control units having a radio communication function, or radio communication devices externally connected to the electronic control units. Alternatively, the terminals 11 may also be roadside devices, for instance, street lamps, signal lamps, etc. having a radio communication function.

The base stations 12 may be network-side devices in the radio communication system. The radio communication system may be a 4th generation mobile communication (4G) system, which is also called a long term evolution (LTE) system. Alternatively, the radio communication system may also be a 5G system, which is also called a new radio (NR) system or a 5G NR system. Alternatively, the radio communication system may also be any generation system. An access network of the 5G system may be called a new generation-radio access network (NG-RAN), or a machine-type communication (MTC) system.

The base stations 12 may be evolved nodes B (eNBs) employed in the 4G system. Alternatively, the base stations 12 may also be next generation nodes B (gNBs) employing a centralized-distributed architecture in the 5G system. When employing the centralized-distributed architecture, each base station 12 may include a central unit (CU) and at least two distributed units (DUs). The central unit is provided with a protocol stack of a packet data convergence protocol (PDCP) layer, a radio link control (RLC) layer, and a media access control (MAC) layer. Each distributed unit is provided with a protocol stack of a physical (PHY) layer. Specific embodiments of the base stations 12 are not limited in the examples of the disclosure.

The base stations 12 are in radio connection with the terminals 11 through a wireless radio. In different embodiments, the wireless radio is a wireless radio based on a standard of the 4th generation mobile communication (4G) or a standard of the 5th generation mobile communication (5G), and is a new radio, for instance. Alternatively, the wireless radio may also be a wireless radio based on a standard of a next generation mobile communication following 5G.

In some examples, an end to end (E2E) connection may also be established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system described above may further encompass a network management device 13.

Several base stations 12 are individually connected to the network management device 13. The network management device 13 may be a core network device in the radio communication system, for instance, the network management device 13 may be a mobility management entity (MME) in an evolved packet core (EPC). Alternatively, the network management device may be another core network device, for instance, a serving gateway (SGW), a public data network gateway (PGW), a policy and charging rules function (PCRF), a home subscriber server (HSS), etc. An implementation form of the network management device 13 is not limited to the examples of the disclosure.

Execution subjects involved in the examples of the disclosure include, but are not limited to, user equipment (UE) in a cellular mobile communication system, a base station of cellular mobile communication, etc.

As the shortage of radio spectrum resources grows, the use range of unlicensed spectrum expands. When the unlicensed spectrum is used, it's common practice to monitor a channel before a transmission terminal occupies the channel to transmit data, that is, a clear channel assessment (CCA). If the channel is assessed as clear, the terminal will occupy the channel to transmit the data, with a maximum channel occupy time (MCOT) specified by a protocol or configured/indicated by a base station. If the channel is assessed as busy, the terminal will not occupy the channel. Such a channel access mechanism is known as listen before talk (LBT) on an unlicensed frequency band. An issue concerning new radio (NR), a channel access mechanism supporting No-LBT has been determinately required. After the No-LBT mechanism is introduced, urgent technical problems, including how to switch between a No-LBT channel access mechanism and a LBT channel access mechanism, a switching time, a switching condition, etc., are to be solved immediately.

FIG. 2 is a schematic flowchart of a method for communication shown according to an example. As shown in FIG. 2, the method for communication in the example is suitable for a UE side and specifically includes:

step 201, in response to determining that UE is configured with a configured grant physical uplink shared channel (CG-PUSCH) and an access mechanism is no listen before talk (No-LBT), whether a channel interference parameter is greater than a first threshold is determined.

In the example of the disclosure, the No-LBT refers to a channel access mechanism in which a transmission terminal does not perform a channel assessment before transmitting data on an unlicensed spectrum. Contrary to LBT, the transmission terminal defaults to low interference between unlicensed spectra under the No-LBT mechanism, and may preempt resources for data transfer.

As an embodiment, the UE may determine the channel interference parameter on the basis of a channel assessment result or a correct transmission probability of historical data. For example, a transmission power of the unlicensed channel may be measured, and serves as the channel interference parameter. When the transmission power is lower than a certain threshold, the channel interference parameter is greater than the first threshold, and it is determined that a transfer quality of the unlicensed channel is unsatisfied, and the reliability for transmitting the CG-PUSCH is low. The UE may also determine whether the transfer quality of the unlicensed channel is unsatisfied on the basis of the acquired correct transmission probability of the historical data. For example, when the correct transmission probability of the historical data of the current unlicensed channel is lower than 40%, it is determined that the channel interference parameter is greater than the first threshold. Here, the first thresholds differ according to the specific physical meaning of the channel interference parameter, and have different measurement forms. It should be understood by those skilled in the art that all interference parameters that may determine the transfer quality of the unlicensed channel may be used as the interference parameters in the example of the disclosure, and the first threshold differs on the basis of different interference parameters.

Step 202, in response to determining that the channel interference parameter is greater than the first threshold, a channel access mechanism is switched to an LBT mode to transmit the CG-PUSCH.

In some examples of the disclosure, an LBT mode may also refer to an LBT mechanism, or, an LBT access mechanism. Correspondingly, a no-LBT mode may also refer to a no-LBT mechanism, or, a no-LBT access mechanism.

In the example of the disclosure, the transfer quality and an interference degree of the unlicensed channel are determined according to the transmission power of the unlicensed channel, the correct transmission probability of the historical data, etc. In response to determining that the channel interference parameter is greater than the first threshold, the current channel access mechanism is switched from the No-LBT to LBT, and the CG-PUSCH is transmitted in the LBT mode. That is, when the interference of the unlicensed channel is high, the UE is required to re-switch to the LBT channel access mode, and to perform a corresponding assessment on the unlicensed channel before accessing, so as to ensure correct transmission of the data carried on the CG-PUSCH.

As an embodiment, in the example of the disclosure, the UE may transmit information about switching to the LBT mode to a network side through upper layer signaling or physical layer indication information. The upper layer signaling here may be a radio resource control (RRC) signaling, etc.

In the example of the disclosure, before the step that a channel access mechanism is switched to an LBT mode to transmit the CG-PUSCH, it is required that the UE acquires a configuration parameter of the LBT mode, and transmits the CG-PUSCH according to the configuration parameter. Specifically, the step that the UE acquires a configuration parameter of the LBT mode includes: the UE receives the configuration parameter of the LBT mode transmitted by the network side, and acquires the specific configuration parameter of the LBT mode through the configuration parameter of the network side; and alternatively, the UE may also determine the configuration parameter of the LBT mode on the basis of a communication protocol. For example, if the configuration parameter of the LBT mode is specified in the communication protocol, the UE will be pre-configured with the configuration parameter of the LBT mode, and the UE may directly transmit the CG-PUSCH on the basis of the configuration parameter of the LBT mode.

In the example of the disclosure, the configuration parameter of the LBT mode includes at least one of the following: a channel priority or a maximum channel occupy time.

In the example of the disclosure, when the UE determines that the channel interference parameter is less than a second threshold, the channel access mechanism is switched to a No-LBT mode. That is, when the UE determines that an interference level of the current unlicensed channel is reduced, for instance, when the channel interference parameter is less than the second threshold, the UE may re-switch from the LBT mode to the No-LBT mode. Here, the second threshold may be the same as the first threshold, or less than the first threshold. When the second threshold is less than the first threshold, that is, after the interference of the channel is lower than the first threshold by a certain degree, the channel access mechanism is switched from the LBT mode to the No-LBT mode.

In the example of the disclosure, when the interference of the unlicensed channel is low, the No-LBT may be used, and the transmission terminal may directly transmit the data. When the interference of the channel is high, the LBT should be used, so as to avoid interference from other nodes, and to avoid bringing more interference to a network. The transmission terminal in the example of the disclosure may be a network-side device such as a base station, a relay station, a remote radio unit, etc., and may also be the UE.

With the network-side device as the base station as an example, at a base station side, the base station may automatically determine whether to use the LBT for transmission. It may also be specified in the protocol that the LBT must be used if the base station assesses that interference of the channel exceeds a certain threshold. The UE is not required to be notified of whether the base station side uses the LBT.

At the UE side, whether data transmission at the UE side is on the basis of the No-LBT or the LBT, and specific parameters for performing the LBT should be specifically specified by the base station. In most cases, the UE is not required to automatically switch between the No-LBT and the LBT. However, if the base station configures a semi-static CG-PUSCH resource for the UE and a No-LBT channel access mode, in a subsequent transmission process, if it is assessed that the interference of the channel increases, the UE may switch to the LBT mode to transmit the CG-PUSCH.

In the example of the disclosure, if the base station configures the CG-PUSCH for the UE and the channel access mechanism is configured as the No-LBT, when assessing that the interference of the channel is greater than the threshold, the UE may automatically switch to the LBT mode to transmit the CG-PUSCH according to the channel interference condition.

The UE may notify the base station of the switch behavior through upper layer signaling or physical layer indication information, so as to inform the base station that the channel interference condition of the UE is changed. In this way, when indicating the LBT mode in a subsequent dynamic scheduling process, the base station may also refer to the reported information to configure the No-LBT mode and the LBT mode of the UE correspondingly. For example, when subsequently scheduling the UE in a dynamic scheduling mode, the base station will instruct the UE to access the unlicensed channel in the LBT mode, instead of the No-LBT mode.

Specific LBT parameters used by the UE after automatic switch, such as a channel priority parameter, a maximum channel occupy time parameter, etc., may be pre-agreed in the communication protocol, or configured for the UE by the base station.

The UE may evaluate the channel interference condition in various manners, such as through the correct transmission probability of the historical data, the channel assessment result, etc. If a correct data transfer rate counted by the UE is lower than a certain threshold, or a channel quality shown through the channel assessment result is lower than a certain threshold, the terminal may deem that the interference of the channel has exceeded the threshold described above.

Similarly, for the CG-PUSCH configured as the No-LBT, if it is assessed that the interference of the channel is lower than a certain threshold, the channel access mechanism may be re-switched to the No-LBT channel access mode.

FIG. 3 is a schematic structural diagram of a configuration of an apparatus for communication shown according to an example. As shown in FIG. 3, the apparatus for communication in the example of the disclosure includes:

a first determination unit 30 configured for determining, in response to determining that UE is configured with a CG-PUSCH and an access mechanism is No-LBT, whether a channel interference parameter is greater than a first threshold, and triggering, in response to determining that the channel interference parameter is greater than the first threshold, a switch unit 31;

the switch unit 31 is configured for switching from a No-LBT mode to an LBT mode; and a transmission unit 32 configured for transmitting the CG-PUSCH in the LBT mode.

In some examples, the transmission unit 32 is further configured for transmitting information about switching to the LBT mode to a network side through upper layer signaling or physical layer indication information.

In some examples, the transmission unit 32 is further configured for acquiring a configuration parameter of the LBT mode, and transmitting the CG-PUSCH according to the configuration parameter.

On the basis of the apparatus for communication shown in FIG. 3, the apparatus for communication in the example of the disclosure further includes:

a reception unit (not shown in FIG. 3) configured for receiving the configuration parameter of the LBT mode transmitted by the network side.

On the basis of the apparatus for communication shown in FIG. 3, the apparatus for communication in the example of the disclosure further includes:

a second determination unit (not shown in FIG. 3) configured for determining the configuration parameter of the LBT mode on the basis of a communication protocol.

In some examples, the configuration parameter includes at least one of the following:

a channel priority or a maximum channel occupy time.

On the basis of the apparatus for communication shown in FIG. 3, the apparatus for communication in the example of the disclosure further includes:

a third determination unit (not shown in FIG. 3) configured for determining the channel interference parameter on the basis of a channel assessment result or a correct transmission probability of historical data.

In some examples, the switch unit 31 is further configured for switching to the No-LBT mode when the first determination unit 30 determines that the channel interference parameter is less than a second threshold.

In an example, the first determination unit 30, the switch unit 31, the transmission unit 32, the reception unit, the second determination unit, the third determination unit, etc. may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), micro processors, or other electronic elements, and may also be implemented in combination with one or more radio frequency (RF) antennas, so as to execute the method for communication in the foregoing example.

In the example of the disclosure, for the apparatus for communication shown in FIG. 3, a specific way for each unit to execute an operation has been described in detail in the example relating to the method, and will not be described in detail here.

Figure 4:
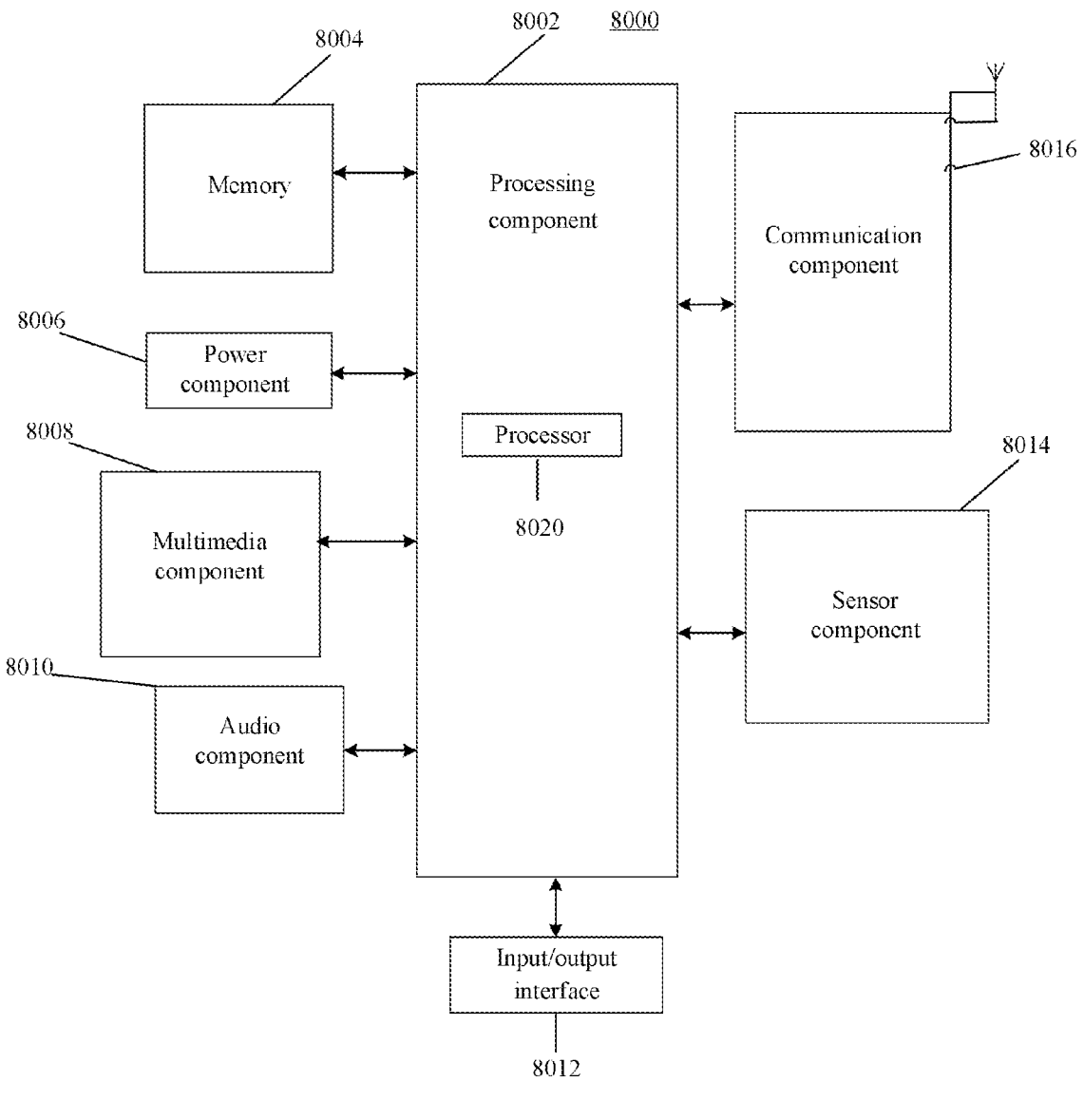
FIG. 4 is a schematic structural diagram of a composition of user equipment shown according to an example.

FIG. 4 is a block diagram of user equipment 8000 shown according to an example. For instance, the user equipment 8000 may be a mobile phone, a computer, digital broadcast user equipment, a message transceiving device, a gaming console, a tablet device, a medical device, a fitness device, a personal digital assistant, etc.

With reference to FIG. 4, the user equipment 8000 may include one or more of a processing component 8002, a memory 8004, a power component 8006, a multimedia component 8008, an audio component 8010, an input/output (I/O) interface 8012, a sensor component 8014, and a communication component 8016.

The processing component 8002 generally controls an overall operation of the user equipment 8000, for instance, operations associated with display, phone calls, data communication, camera operations, and recording operations. The processing component 8002 may include one or more processors 8020 to execute an instruction, so as to complete all or some of the steps of the method described above. In addition, the processing component 8002 may include one or more modules to facilitate interaction between the processing component 8002 and other assemblies. For instance, the processing component 8002 may include a multimedia module to facilitate interaction between the multimedia component 8008 and the processing component 8002.

The memory 8004 is configured for storing various types of data to support operations on the user equipment 8000. Instances of these data include an instruction, operated on the user equipment 8000, for any application or method, contact data, phonebook data, messages, pictures, video, etc. The memory 8004 may be implemented by any type of volatile or non-volatile storage devices or a combination of both, such as a static random access memory (SRAM), an electrically erasable programmable read-only memory (EEPROM), an erasable programming read-only memory (EPROM), a programmable read-only memory (PROM), a read-only memory (ROM), a magnetic memory, a flash memory, a magnetic disk or an optical disk.

The power component 8006 provides power for various assemblies of the user equipment 8000. The power component 8006 may include a power supply management system, one or more power supplies, and other assemblies associated with power generation, management, and distribution for the user equipment 8000.

The multimedia component 8008 includes a screen that provides an output interface between the user equipment 8000 and a user. In some examples, the screen may include a liquid crystal display (LCD) and a touch panel (TP). If including a touch panel, the screen may be implemented as a touch screen, so as to receive an input signal from the user. The touch panel includes one or more touch sensors, to sense touches, swipes, and gestures on the touch panel. Except for sensing a boundary of a touch or swipe action, the touch sensor may also assess a duration and a pressure associated with touch or swipe operations. In some examples, the multimedia component 8008 includes a front-facing camera and/or a rear-facing camera. When the user equipment 8000 is in an operation mode, such as a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio component 8010 is configured for outputting and/or inputting audio signals. For instance, the audio component 8010 includes a microphone (MIC) configured for receiving external audio signals when the user equipment 8000 is in the operation mode, for instance, a calling mode, a recording mode, and a speech recognition mode. The received audio signals may be further stored in the memory 8004 or transmitted via the communication component 8016. In some examples, the audio component 8010 may further include a speaker to output the audio signals.

The I/O interface 8012 provides an interface between the processing component 8002 and a peripheral interface module, such as a keyboard, a click wheel, a button, etc. These buttons may include, but are not limited to, a home button, a volume button, a start button, and a lock button.

The sensor component 8014 includes one or more sensors for providing state assessments of various aspects for the user equipment 8000. For instance, the sensor component 8014 may assess an on/off state of the user equipment 8000 and relative locating of the assemblies. For instance, the assemblies are a display and a keypad of the user equipment 8000. The sensor component 8014 may also assess a change in the position of the user equipment 8000 or one component of the user equipment 8000, the presence or not of contact between the user and the user equipment 8000, orientation or acceleration/deceleration of the user equipment 8000, and a change in temperature of the user equipment 8000. The sensor component 8014 may include a proximity sensor configured for assessing the presence of objects nearby without any physical contact. The sensor component 8014 may further include light sensors, such as a complementary metal-oxide-semiconductor transistor (CMOS) or a charge coupled device (CCD) image sensor for use in imaging application. In some examples, the sensor component 8014 may also include an acceleration sensor, a gyroscope sensor, a magnetic sensor, a pressure sensor, or a temperature sensor.

The communication component 8016 is configured for facilitating communication between the user equipment 8000 and other devices in a wired or wireless manner. The user equipment 8000 may access a wireless network based on a communication standard, for instance, wireless fidelity (Wi-Fi), 2G or 3G, or a combination of them. In an example, the communication component 8016 receives a broadcast signal or broadcast related information from an external broadcast management system via a broadcast channel. In an example, the communication component 8016 further includes a near field communication (NFC) module, to facilitate short-distance communication. For instance, the NFC module may be implemented on the basis of a radio frequency identification (RFID) technology, an infrared data association (IrDA) technology, an ultra wide band (UWB) technology, a Bluetooth (BT) technology, etc.

In an example, the user equipment 8000 may be implemented by one or more application specific integrated circuits (ASICs), digital signal processors (DSPs), digital signal processing devices (DSPDs), programmable logic devices (PLDs), field-programmable gate arrays (FPGAs), controllers, micro controllers, micro processors, or other electronic elements for executing the method for communication described above.

In an example, further provided is a non-transitory computer-readable storage medium, including an instruction, for instance, a memory 8004 including an instruction, where the instruction described above may be executed by a processor 8020 of the user equipment 8000, so as to complete the method for communication described above. For instance, the non-transitory computer-readable storage medium may be an ROM, a random access memory (RAM), a compact disk (CD)-ROM, a magnetic tape, a floppy disk, an optical data storage device, etc.

An example of the disclosure further describes user equipment. The user equipment includes a processor, a transceiver, a memory, and an executable program stored on the memory and runnable by the processor, where when running the executable program, the processor executes steps of the method for communication in the foregoing example.

An example of the disclosure further describes a storage medium, storing an executable program, where when executed by a processor, the executable program implements steps of the method for communication in the foregoing example.

According to the method, apparatus, user equipment, and the storage medium for communication in the examples of the disclosure, in response to determining that the UE is configured with the CG-PUSCH and a current unlicensed channel access mechanism is the No-LBT, a current channel quality condition is determined, for instance, a transfer quality and an interference degree of an unlicensed channel are determined according to a transmission power of the unlicensed channel, the correct transmission probability of the historical data, etc. In response to determining that the channel interference parameter is greater than the first threshold, the current channel access mechanism is switched from the No-LBT to LBT, and the CG-PUSCH is transmitted in the LBT mode. The examples of the disclosure ensure the reliability for the data transfer of the CG-PUSCH. The unlicensed channel is unreliable for data transfer in terms of a channel occupation mode. By way of the examples of the disclosure, the reliability of the data transfer of the CG-PUSCH is ensured, a system communication quality is improved, and a utilization benefit of an unlicensed spectrum is increased.

Other embodiments of the examples of the disclosure will be readily conceived by those skilled in the art in consideration of the description and practice of the invention disclosed here. The disclosure is intended to cover any variations, uses, or adaptive changes of the examples of the disclosure following the general principles of the examples of the disclosure and including common general knowledge or conventional technical means in the technical field not disclosed in the examples of the disclosure. The description and the examples are deemed as illustrative only, and the true scope and spirit of the examples of the disclosure are indicated by the following claims.

It should be understood that the examples of the disclosure are not limited to precise structures which have been described above and shown in the accompanying drawings, and can have various modifications and changes without departing from the scope of the disclosure. The scope of the examples of the disclosure is limited by the appended claims only.

What is claimed is:

1. A method for communication, performed by a user equipment (UE) and comprising:
   determining whether a channel interference parameter is greater than a first threshold, in response to determining that a configured grant physical uplink shared channel (CG-PUSCH) is configured and an access mechanism is no listen before talk (No-LBT); and
   switching to an LBT mode to transmit the CG-PUSCH, in response to determining that the channel interference parameter is greater than the first threshold.

2. The method according to claim 1, further comprising:
   transmitting information for switching to the LBT mode to a network side through upper layer signaling or physical layer indication information.

3. The method according to claim 1, wherein the switching to the LBT mode to transmit the CG-PUSCH comprises:
   acquiring a configuration parameter of the LBT mode, and transmitting the CG-PUSCH according to the configuration parameter.

4. The method according to claim 3, wherein the UE acquiring the configuration parameter of the LBT mode comprises:
   receiving the configuration parameter of the LBT mode transmitted by a network side; or
   determining the configuration parameter of the LBT mode based on a communication protocol.

5. The method according to claim 4, wherein the configuration parameter comprises at least one of:
   a channel priority, or
   a maximum channel occupy time.

6. The method according to claim 1, further comprising:
   determining the channel interference parameter based on a channel assessment result or a correct transmission probability of historical data.

7. The method according to claim 1, further comprising:
switching to a No-LBT mode, after the switching to the LBT mode to transmit the CG-PUSCH, in response to determining that the channel interference parameter is less than a second threshold.

8. A user equipment, comprising:
a transceiver;
a memory; and
a processor that is communicatively coupled to the transceiver and the memory, wherein is configured to:
determine whether a channel interference parameter is greater than a first threshold, in response to determining that a configured grant physical uplink shared channel (CG-PUSCH) is configured and an access mechanism is no listen before talk (No-LBT); and
switch to an LBT mode to transmit the CG-PUSCH, in response to determining that the channel interference parameter is greater than the first threshold.

9. A non-transitory storage medium, storing an executable program, wherein the executable program when executed by a processor cause the processor to execute a method comprising:
determining whether a channel interference parameter is greater than a first threshold, in response to determining that a configured grant physical uplink shared channel (CG-PUSCH) is configured and an access mechanism is no listen before talk (No-LBT); and
switching to an LBT mode to transmit the CG-PUSCH, in response to determining that the channel interference parameter is greater than the first threshold.

10. The method according to claim 6, further comprising:
switching to a No-LBT mode, after the switching to the LBT mode to transmit the CG-PUSCH, in response to determining that the channel interference parameter is less than a second threshold.

11. The user equipment according to claim 8, wherein the processor is further configured to:
transmit information for switching to the LBT mode to a network side through upper layer signaling or physical layer indication information.

12. The user equipment according to claim 8, wherein the processor is further configured to:
acquire a configuration parameter of the LBT mode, and transmitting the CG-PUSCH according to the configuration parameter.

13. The user equipment according to claim 11, wherein the processor is further configured to:

receive a configuration parameter of the LBT mode transmitted by the network side; or,
determine the configuration parameter of the LBT mode based on a communication protocol.

14. The user equipment according to claim 12, wherein the configuration parameter comprises at least one of:
a channel priority, or
a maximum channel occupy time.

15. The user equipment according to claim 8, wherein the processor is further configured to:
determine the channel interference parameter based on a channel assessment result or a correct transmission probability of historical data.

16. The user equipment according to claim 8, wherein the processor is further configured to:
switch to a No-LBT mode, after the switching to the LBT mode to transmit the CG-PUSCH, in response to determining that the channel interference parameter is less than a second threshold.

17. The user equipment according to claim 14, wherein the processor is further configured to:
switch to a No-LBT mode, after the switching to the LBT mode to transmit the CG-PUSCH, in response to determining that the channel interference parameter is less than a second threshold.

18. The non-transitory storage medium according to claim 9, wherein the executable program when executed by the processor further cause the processor to:
transmit information for switching to the LBT mode to a network side through upper layer signaling or physical layer indication information.

19. The non-transitory storage medium according to claim 9, wherein the executable program when executed by the processor further cause the processor to:
acquire a configuration parameter of the LBT mode, and transmitting the CG-PUSCH according to the configuration parameter.

20. The non-transitory storage medium according to claim 19, wherein the executable program when executed by the processor further cause the processor to:
receive the configuration parameter of the LBT mode transmitted by a network side; or
determine the configuration parameter of the LBT mode based on a communication protocol.

* * * * *